United States Patent
Cantwell

(10) Patent No.: US 6,220,333 B1
(45) Date of Patent: Apr. 24, 2001

(54) BAR CODE STENCIL AND METHOD OF USE

(76) Inventor: Jay S. Cantwell, 3905 Avery Place Ct., Bridgeton, MO (US) 63044

( * ) Notice: Subject to any disclaimer, the term of this patent is extended or adjusted under 35 U.S.C. 154(b) by 0 days.

(21) Appl. No.: 09/187,017

(22) Filed: Nov. 6, 1998

(51) Int. Cl.$^7$ .................................................. B22D 46/00
(52) U.S. Cl. .......................... 164/4.1; 164/229; 264/132
(58) Field of Search .................. 164/4.1, 150.1, 164/229; 249/103; 264/132

(56) References Cited

U.S. PATENT DOCUMENTS

| | | |
|---|---|---|
| 4,047,000 | 9/1977 | Bryant et al. . |
| 4,061,174 * | 12/1977 | Edwards .......................... 249/103 X |
| 4,175,236 | 11/1979 | Juvinall ................................ 250/566 |
| 4,536,421 | 8/1985 | Matsuzawa et al. .................. 427/282 |
| 4,625,101 | 11/1986 | Hinks et al. . |
| 4,900,637 * | 2/1990 | Darovec ............................ 164/111 X |
| 4,941,522 | 7/1990 | Sakurai ................................ 152/523 |
| 5,160,383 | 11/1992 | Gartland et al. ..................... 152/510 |
| 5,329,985 * | 7/1994 | Weimann ............................ 164/4.1 X |
| 5,786,028 | 7/1998 | Cantwell .............................. 427/282 |

FOREIGN PATENT DOCUMENTS

| | | | |
|---|---|---|---|
| 683073 * | 1/1994 | (CH) ...................................... 164/4.1 |
| 4-75761 * | 3/1992 | (JP) ....................................... 164/4.1 |
| 4-75762 * | 3/1992 | (JP) ....................................... 164/4.1 |

* cited by examiner

*Primary Examiner*—Harold Pyon
*Assistant Examiner*—I.-H. Lin
(74) *Attorney, Agent, or Firm*—Banner & Witcoff, Ltd.

(57) ABSTRACT

A bar code identification stencil for uniquely identifying a plurality of articles. The stencil includes a carrier strip which carries an identification code. The identification code is formed of a plurality of spaced apart markers of voids which are used to form a machine readable bar code. The bar code is unique for each of the plurality of articles to be identified.

5 Claims, 4 Drawing Sheets

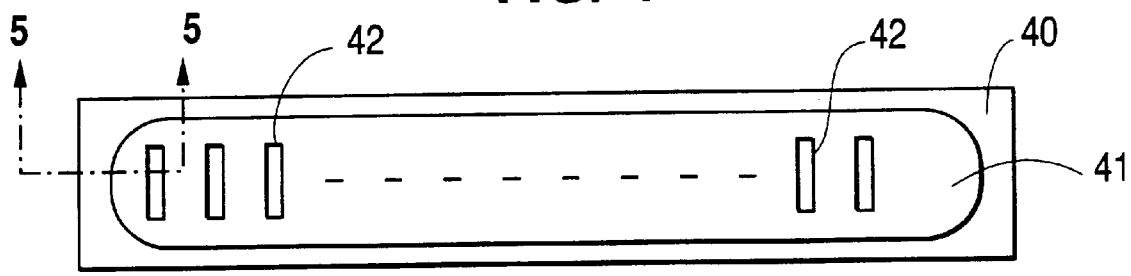
FIG. 4
FIG. 5
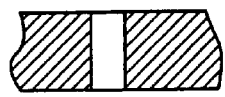
FIG. 6
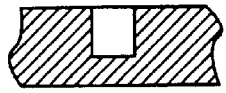
FIG. 7
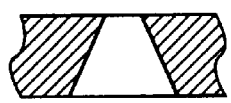
FIG. 8
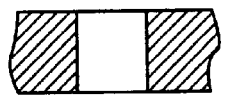
FIG. 9
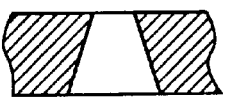

BAR CODE STENCIL AND METHOD OF USE

BACKGROUND OF THE INVENTION

The present invention relates to the field of identification bar codes and scanners and more particularly, is directed to a bar code stencil and method of using such a stencil to integrally embed a bar code into an article during its manufacture. The stencil may also be used in a post production or after market identification procedure for bar code marking of articles.

The development of modern bar codes began in the 1940s in response to the food industry's need for a reliable and economical system for inventory control and for automatically reading product information at grocery store check outs. The first patent to issue on such a system is believed to be U.S. Pat. No. 2,612,994 entitled "Classifying Apparatus and Method" and which issued on Oct. 7, 1952.

Although the coding system used in the '994 patent relied on a series of concentric circles to encode the identification information, the original coding approach developed by the inventors was a series of narrow and wide vertical lines much like present day bar code systems. Early implementations of the concentric circle approach proved unreliable however, as the circles were difficult to print without smearing. Smeared circles introduced reading errors when scanned and thus were unacceptable. The use of vertical bars eliminated the smearing problem and associated scanning errors.

Since the adoption of the Universal Product Code (UPC) in 1973, bar codes have proliferated to virtually all areas of article and product identification. Bar codes are now widely recognized as an economical and reliable identification system.

Over the years, a number of different versions of the UPC bar code have been developed. Version A is one of the most popular and is illustrated in FIG. 1. The Version A format includes a plurality of spaced vertical bars 1 which form the bar code and a plurality of human readable digits which correspond to the bar code, i.e, "0 25528 43507 3" as indicted by reference number 2.

As shown in FIG. 1, the code is divided into 12 digits, with the first digit 3 being usually a "0". The next five digits 4 are assigned to the product manufacturer by the Uniform Code Council and thus serve to identify the manufacturer. Accordingly, all of the bar codes for the same manufacturer will have this same five digits. The next five digits 5 represent the item identification code given to a particular product by the manufacture. Thus, 99,999 products can be uniquely identified. The final twelfth digit 6 is a check digit which is used by the bar code scanner to confirm the accuracy of the scan.

Each of the human readable digits is encoded into the code using a two-part binary coding system as indicated in the table below:

| Digit Value | Code Key Left Binary Code | Right Binary Code |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

Each "1" in the key code is represented by a black bar 7 as illustrated in FIG. 1 and each "0" in the key code is represented by a white or space 8. There is a center code of four lines (binary digits 01010) which bisect the bar code. On the left side of the bar code, the Left Binary Code digits from the above table are used and on the right side of the bar code, the Right Binary Code digits from the table are used. This mirror image coding technique allows the scanner to read the number code in either direction. Start and stop codes are used by the scanner to set the width of the binary digits within the bar code symbol. The scanner also uses the check digit to calculate a check sum as is know in the art. If the correct check sum is not calculated, the bar code read is rejected.

FIG. 2 is a further illustration of a typical UPC bar code with its constituent parts labeled.

As a testament to the popularity of bar code use, the UPC bar code is scheduled to be phased out by the year 2005 because its 12-digit length will no longer be sufficient to handle the demand for bar codes. In its place, the United States is expected to adopt a version of the European Article Numbering (EAN) system. The EAN bar code system has thirteen digits and can thus accommodate substantially more product identifications than the UPC.

The traditional printed bar code system continues to serve its original purpose of grocery store inventory control and check out very well. Bar codes formed of conventional two-dimensional printed bars work well where the article to be labeled is not subject to a harsh environment and the bar code label is not likely to be rubbed off or smeared over so that it can not be read.

The food industry serves as an ideal environment for conventional bar codes. Bar codes used for food labeling are unlikely to be subjected to harsh environments due to the inherent need to prevent adulteration and damage to the food package. Thus, the bar code label is not likely to become damaged or unreadable.

The bar code system has in some respects however, become the victim of its own success. Today, attempts are being made to use bar codes in many environments in which a conventional printed two-dimensional bar code, such as the one used for food products, can not be used. One such environment is the tire manufacturing industry.

U.S. Pat. No. 5,160,383 assigned to Goodyear Tire & Rubber discloses one example of the use of a bar code labeling technique in the tire industry. According to the patent, it is important that a tire label be highly durable so that it may still be read after many years of tire service and multiple retreading. The patent also notes that serial numbers can be molded into tire side walls but that doing so is labor intensive and costly. Thus, Goodyear sought to improve upon conventional tire labeling systems by attaching an identification label to the rubber inter lining of an uncured tire. The label is made of two materials which are co-curable with the rubber of the tire. The tire is then cured using a conventional curing process which results in the label becoming permanently affixed to the inside of the tire.

Goodyear also is the assignee of U.S. Pat. No. 4,625,101 which discloses a method of molding a bar code configuration onto the sidewall of a tire. The bar code configuration has a plurality of sloped reflective surfaces which allow more flexibility in locating the bar code scanner without adversely effecting the accuracy of the scan. A bar code plate mold insert is used to mold the bar code configuration into the side wall of the tire during the vulcanization process.

Another technique for labeling a tire is disclosed in U.S. Pat. No. 4,941,522 assigned to the Yokohama Rubber Company. The Yokohama approach involves an improved bar code plate mold insert which is also used to mold a bar code into a side wall of the tire during the vulcanization process. The improved plate is said to solve the problem of deterioration of the tire's resistance to weather in the area of the molded bar code.

Like the tire manufacturing industry, bar code labels also have great utility in other harsh environments as well. For example, domestic metal casters cast and ship millions of tons of product each year. An effective way to identify each product for tracking and inventory control purposes is to label it with a bar code. Because casts usually are subjected to a post casting process to finish and shape them to their final form, a conventional printed bar code label is often difficult to apply to a casting surface and is also subject to being rubbed off or covered over during the subsequent finishing process. Moreover, a printed bar code label is likely to deteriorate over time, well before the end of the life of the cast it self, making the bar code difficult or impossible to read.

Ideally, an identification bar code will be embedded into the article during the manufacturing process. Doing so, avoids the possibility of mis-identification, i.e., the wrong bar code being applied, in a subsequent labeling step.

In order to improve the durability and readability of bar codes in harsh environments such as casting, a three dimensional bar code construction was developed. An end view of a portion of such a bar code is illustrated in FIG. 3. Each bar has a width 30 and a height 31. The distinguishing feature of this type of bar code is its height 31. The bar code is scanned by a three dimensional bar code reader which detects the presence or absence of a bar based on its height rather than its contrast as a conventional two dimensional bar code reader does. Thus, a three dimensional bar code can be read when no contrast is available. Three dimensional bar code readers are known in the art, and include the readers manufactured by Sensis Corporation for reading Bumpy Bar Codes™.

Three dimensional bar codes have proved to be a much better choice in some situations as they will not easily rub off, smear, peel or vanish. They can be painted over or the article on which they are placed can be subjected to various treatment processes without the readability of the bar code being adversely affected. Three dimensional bar codes are also useful where a traditional printed bar code label will not adhere to the surface of the article to be labeled.

The use of bar codes during manufacture for work-in-process tracking, inventory control, work piece routing, etc., has become a valuable tool. Embedding the bar code into the article during its manufacture is the most expedient and cost effective identification system. However, due to the harsh environments in which many manufacturing processes occur, embedding a bar code into a manufactured article can present a challenge. The challenge usually involves overcoming the ill effects caused by the very high temperatures and pressures that are present in, e.g, cast and molding processes. Thus, there is a need in the art for a bar code stencil which can be easily and reliably used for embedding bar codes into articles during their manufacture.

SUMMARY OF THE INVENTION

Accordingly, it is an objective of the present invention to obviate the above-noted shortcomings and disadvantages of present methods of marking an article with a bar code.

It is a further objective of the present invention to provide an improved method of bar code marking which is more reliable and cost effective than conventional methods.

It is a still further objective of the present invention to provide an improved method of bar code marking which is economical to implement and simple in operation.

It is a still further objective of the present invention to provide an improved method of bar code marking which can be used in harsh environments.

It is a another objective of the present invention to provide an improved method of bar code marking which can be used to embed a bar code into a metal cast article during the casting process.

It is a further objective of the present invention to provide an improved method of bar code marking which can be used to embed a bar code into a molded article during the molding process.

It is a another objective of the present invention to provide an improved method of bar code marking which can be used to bar code an article in the field.

It is still another objective of the present invention to provide a bar code stencil which allows all of the above noted objectives to achieved.

The bar code stencil of the present invention, allows the embedding of a permanently formed bar code into a cast metal or molded part at the point of manufacture. The stencils can have sequentially numbered bar codes that are placed directly into a mold cavity. Once in the cavity, the mold is closed and filled as normal with the desired material. The result is a bar code that is literally molded or cast onto or into the surface of the finished article out of the same material as the article.

The bars which form the bar code take on a raised, three-dimensional form that has all the strength and visual characteristics of the parent article material and can be read through grease and grim unlike the bars on a printed label.

Several variations of the stencil can be provided for different article manufacturing processes. Variations in the stencils are primarily based on the temperature and pressures that a particular process requires when generating an article. For example, casting a bar code into the side of an iron engine block requires a stencil capable of withstanding in access of 3,000 degrees F. with very little pressure. A stencil for use in molding a bar code integral to an injection molded article, however, requires a material capable of 5,000 degrees F. and 3,500 PSI.

The stencil of the present invention can be sequentially encoded with any number of digits in any x-dimension and with all of the bar code symbologies in use today.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

FIG. 4 is an illustration of a bar code stencil in accordance with the present invention;

FIGS. 5–9 are various bar code cross sections;

DESCRIPTION OF THE PREFERRED EMBODIMENT

Figure 1:
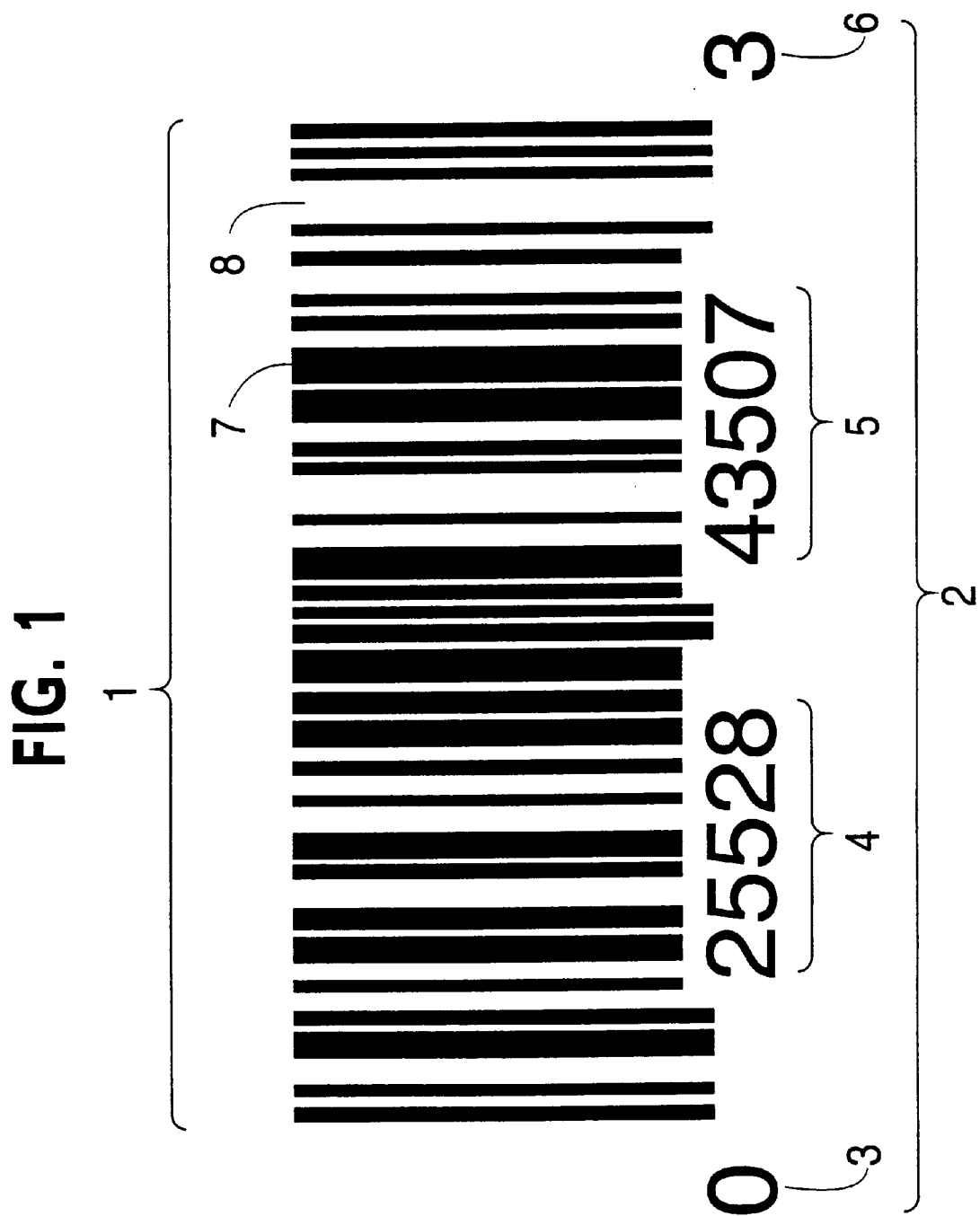
FIGS. 1 and 2 are illustrations of a UPC bar code.
Figure 2:
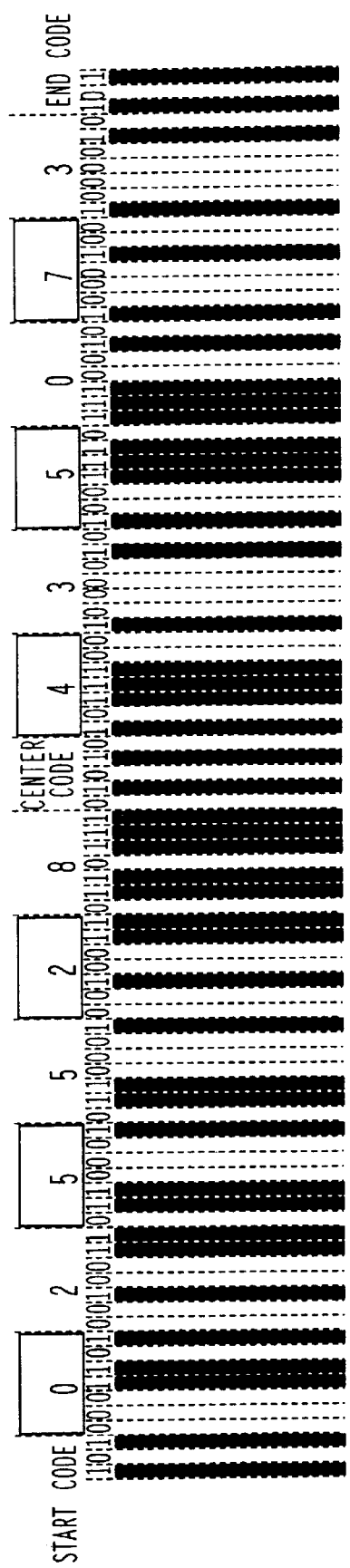
Figure 3:
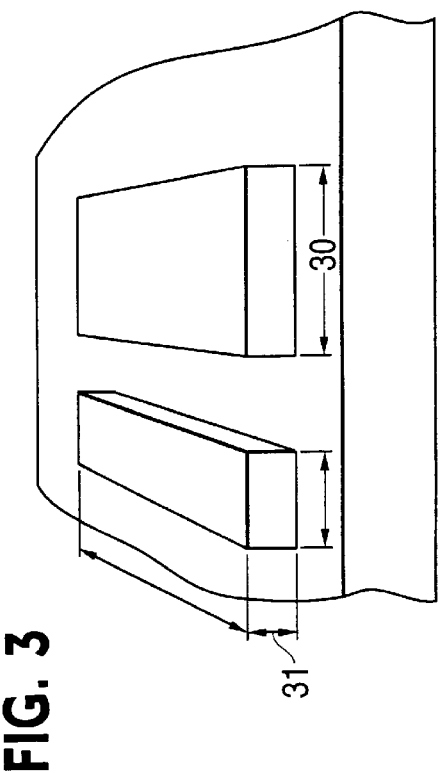
FIG. 3 is an illustration of a three dimensional bar code.

A preferred embodiment of the present invention will now be described with further reference to accompanying drawings.

FIG. 4 illustrates one embodiment of a bar code stencil according to the present invention. The stencil includes a carrier strip 40 with an area 41 in which a plurality of bar code marker locations 42 are provided along carrier strip 40. The stencil may be used with virtually any bar code symbology without departing from the spirit and objectives of the invention.

Carrier strip 40 is generally of rectangular shape and its size will depend on the symbology used and the particular application for which the stencil will be used. Applicant has found that a size of approximately 3½ inches long by ¾ inches wide and 0.100 inches thick to be a convenient size. As discussed below, the size of the stencil may also be a consideration of the starting size of the sheet material from which the stencil is made.

Carrier strip 40 may be made from a number of materials know in the prior art, including materials which have a fiber re-enforcement with a binding agent to contain the fiber re-enforcement. Such materials may typically be fabricated in sheets of approximately 36 ×36×0.100 inches and can usually be custom sized to a user's specification.

The type of material used to make carrier strip 40 will also depend on the structural integrity requirements of the stencil during manufacture of the article for which the stencil will be used to identify. For example during casting with molten metals, temperatures can reach 3,500 degree F. For use in such an environment, carrier 40 may be made from a ceramic fiber material in order to provide the required resistance to high temperature. In some applications, carrier strip 40 may also be subjected to pressures as high as 5,000 PSI, either positive or negative. Thus, the material used to make carrier 40 must be selected accordingly.

In an environment where the stencil will not be subjected to temperature extremes, for example, in an after market label process, carrier 40 may be made with lower temperature grade materials.

At selected marker locations 42, a void is formed in carrier 40 in accordance with the particular bar code symbology to be used. These voids can comprise cutouts which are formed fully through carrier 40 or can be mere depressions created by a press or stamp. FIG. 5 is a cross section of one void formed by a cutout and FIG. 6 is a cross section of a void formed by a depression. Cut outs may ideally be formed in carrier 40 using water jet cutting technology.

Applicant has discovered that the particular profile of the void has a great deal of impact on the durability of the three dimensional bar code formed when the stencil is used in a casting or molding operation. Applicant has learned that a three dimensional bar having a cross section as illustrated in FIG. 7 has greater strength and durability than one having a rectangular cross section as shown in FIG. 8. Thus, voids 42 are ideally formed in carrier 40 with a cross section as illustrated in FIG. 9.

Figure 10:
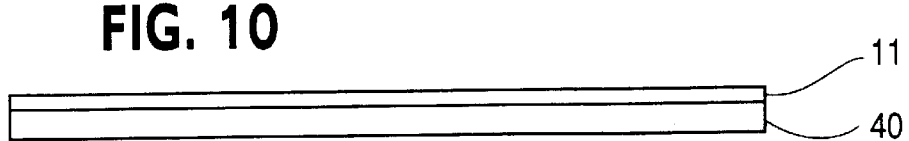
FIG. 10 is a side view of a bar code stencil in accordance with the present invention illustrating the use of a double back adhesive tape.

When used in a cast or mold, the stencil may be attached to a surface of the cast or mold using a number of attachment means, including fastening clips, ties and epoxy. Carrier 40 may also be formed of a material which has been magnetized so that the carrier will naturally stick to the surface of, e.g., a mold. Carrier 40 may also be provided with a double back adhesive 11 for attachment purposes as shown in FIG. 10.

Figure 11:
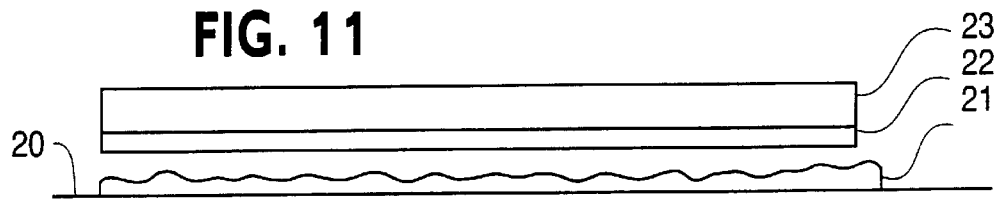
FIG. 11 is a side view of a bar code stencil in accordance with the present invention illustrating the use of an over laminate.

In the case where the stencil is attached using epoxy, the stencil may be provided with an over laminate on the opposed side in order to prevent the epoxy from entering the cut outs which form the bar code bars. FIG. 11 illustrates this application where reference number 20 refers to an interior surface of, for example, a mold, to which an epoxy material 21 is applied to hold stencil 23. An over laminate 22 prevents the epoxy material from entering the cut out.

Figure 12:
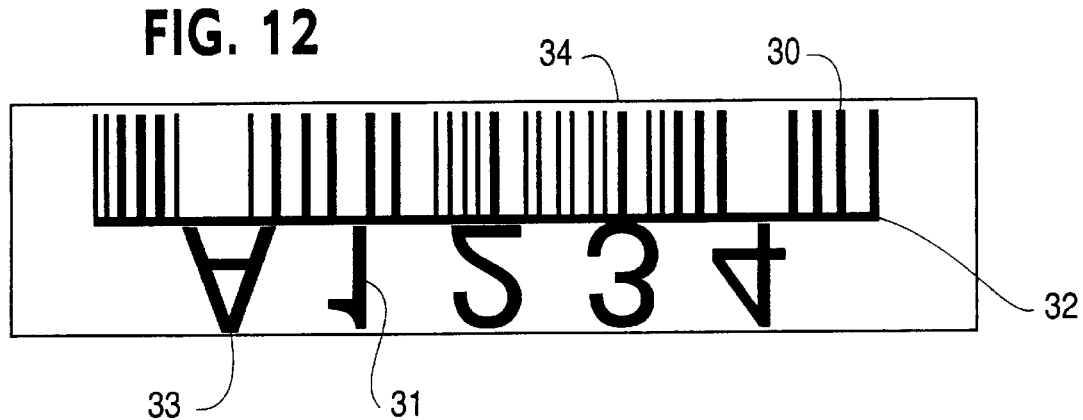
FIG. 12 is a top view of a bar code stencil in accordance with the present invention which is adapted for use in a plastic mold.

FIG. 12 illustrates a bar code stencil which has been formed by depressions 30 at selected marker locations. The stencil also includes human readable digits 31 which correspond to the bar code. Note that one end of each bar and digit character meet at a common runner 32 and that the opposite edges correspond with the edges of the stencil. Such a construction allows the stencil to be easily used in a plastic mode without flashing or incomplete formation of the bar code or human readable digits.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

I claim:

1. A method for uniquely identifying a plurality of cast articles using a machine readable bar code number integrally cast into said articles during the casting process for said cast articles, said method comprising the steps of:

providing a bar code identification stencil having a carrier strip which carries an identification code, said identification code being formed of a plurality of spaced apart voids and being unique with a bar code number for each of said plurality of said articles to be identified;

attaching said stencil to an interior surface of a cast used to cast said articles;

filling said cast with casting material to cast said articles and to fill said voids to thereby form said bar code number; and using a different said stencil for each of a plurality articles to be cast.

2. The method of claim 1, wherein said carrier strip includes an attachment element for attaching said identification stencil to said interior surface of said cast.

3. The method of claim 2, wherein said carrier strip is arranged to be attached to said interior surface of said cast using an attachment material.

4. The method of claim 3, wherein said carrier strip further includes a barrier layer for preventing said attachment material from coming into contact with said carrier strip.

5. A method for uniquely identifying a plurality of molded articles using a machine readable bar code number integrally molded into said articles during the molding process for said articles, said method comprising the steps of:

provforming a bar code identification stencil having a carrier strip which carries an identification code, said identification code being formed of a plurality of spaced apart voids and being unique with a bar code number for each of said plurality of articles to be identified;

attaching said stencil to an interior surface of a mold used to mold said articles;

filling said mold with molding material to mold said articles and to fill said voids to thereby form a bar code number; and using a different said stencil for each of said plurality of articles to be molded.

* * * * *